(12) United States Patent
Mizuseki et al.

(10) Patent No.: US 10,948,670 B2
(45) Date of Patent: Mar. 16, 2021

(54) OPTICAL MODULE

(71) Applicant: Lumentum Japan, Inc., Kanagawa (JP)

(72) Inventors: Sachiko Mizuseki, Kanagawa (JP); Hideki Sato, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/814,686

(22) Filed: Mar. 10, 2020

(65) Prior Publication Data

US 2020/0292768 A1  Sep. 17, 2020

(30) Foreign Application Priority Data

Mar. 12, 2019 (JP) .............................. JP2019-044907

(51) Int. Cl.
H04B 10/00 (2013.01)
G02B 6/42 (2006.01)
H04B 10/50 (2013.01)
H04B 10/25 (2013.01)

(52) U.S. Cl.
CPC ........... *G02B 6/4277* (2013.01); *G02B 6/428* (2013.01); *G02B 6/4246* (2013.01); *G02B 6/4279* (2013.01); *H04B 10/25891* (2020.05); *H04B 10/50* (2013.01)

(58) Field of Classification Search
CPC .................. G02B 6/4277; H04B 10/25891
See application file for complete search history.

(56) References Cited

U.S. PATENT DOCUMENTS

| | | | | |
|---|---|---|---|---|
| 6,755,578 | B1* | 6/2004 | Mynatt | G02B 6/4201 385/147 |
| 7,013,088 | B1* | 3/2006 | Jiang | G02B 6/4204 385/88 |
| 2004/0218848 | A1* | 11/2004 | Shen | G02B 6/43 385/14 |
| 2005/0152701 | A1* | 7/2005 | Liu | H05K 9/0058 398/135 |
| 2007/0210082 | A1* | 9/2007 | English | H05K 9/0032 220/4.21 |
| 2007/0237464 | A1* | 10/2007 | Aronson | G02B 6/4416 385/89 |
| 2008/0240717 | A1* | 10/2008 | Izumi | H04B 10/40 398/79 |
| 2018/0292620 | A1* | 10/2018 | Zheng | G02B 6/4292 |

FOREIGN PATENT DOCUMENTS

JP  2008-249856 A  10/2008

\* cited by examiner

*Primary Examiner* — David C Payne
*Assistant Examiner* — Pranesh K Barua
(74) *Attorney, Agent, or Firm* — Hamty & Harrity, LLP

(57) ABSTRACT

An optical module for transmitting an optical signal may include a circuit board on which electronic components are disposed, a high-frequency component that is disposed on a main surface of the circuit board and operates at a frequency equal to or higher than a predetermined reference value according to a frequency of the optical signal, a low-frequency component that is disposed on another main surface of the circuit board so as to overlap at least partly with the high-frequency component in a plan view and operates at a frequency less than the reference value, and an electromagnetic wave absorber that is disposed on an upper surface of the low-frequency component.

20 Claims, 11 Drawing Sheets

OPTICAL MODULE

CROSS-REFERENCE TO RELATED APPLICATION

The present application claims priority from Japanese application JP 2019-044907 filed on Mar. 12, 2019, which is hereby expressly incorporated by reference herein.

TECHNICAL FIELD

The present disclosure relates to an optical module.

BACKGROUND

In an optical communication system, an optical module that converts one of optical signals and electrical signals to the other or bidirectionally is used. With the spread of broadband networks in recent years, the speed of optical modules has been increased, and electrical circuits in the optical modules have portions that operate at high frequencies. Here, the high-frequency circuit emits an unnecessary electromagnetic wave and can generate so-called electromagnetic interference (EMI).

Since a plurality of optical modules are densely mounted on a single network device, it is required to reduce electromagnetic waves emitted from the optical modules so as not to affect the operation of other devices, in addition to downsizing, low power consumption, and low cost. Therefore, in order to shield the electromagnetic wave, an electromagnetic wave absorber may be disposed in the optical module. For example, the electromagnetic wave absorber may be attached inside a case. However, using a large electromagnetic wave absorber contributes to an increase in cost.

SUMMARY

According to some possible implementations, an optical module for transmitting an optical signal may include a circuit board on which electronic components are disposed, a high-frequency component that is disposed on a main surface of the circuit board and operates at a frequency equal to or higher than a predetermined reference value according to a frequency of the optical signal, a low-frequency component that is disposed on another main surface of the circuit board so as to overlap at least partly with the high-frequency component in a plan view and operates at a frequency less than the reference value, and an electromagnetic wave absorber that is disposed on an upper surface of the low-frequency component.

DETAILED DESCRIPTION

The following detailed description of example implementations refers to the accompanying drawings. The same reference numbers in different drawings may identify the same or similar elements.

Hereinafter, an optical module 1 (1A to 1F) will be described with reference to drawings. In the following description, an XYZ coordinate system is used for a three-dimensional space. The coordinate system is a right-handed orthogonal coordinate system. The optical module 1 has, for example, a substantially elongated rectangular parallelepiped shape, and the longitudinal direction is set to an X axis. In the following description, for the sake of convenience, the X axis and a Y axis are two horizontal axes, a Z axis is a vertical axis, and the positive direction of the Z axis is upward.

Figure 1:
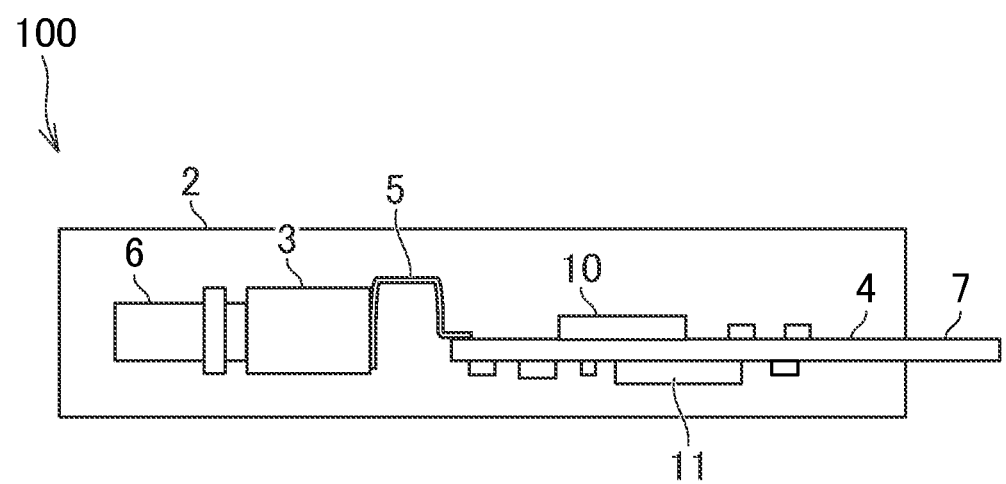
FIG. 1 is a schematic vertical sectional view of an optical module according to a comparative example in which no electromagnetic wave absorber is provided.
Figure 1:
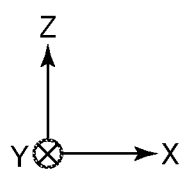
Figure 2:
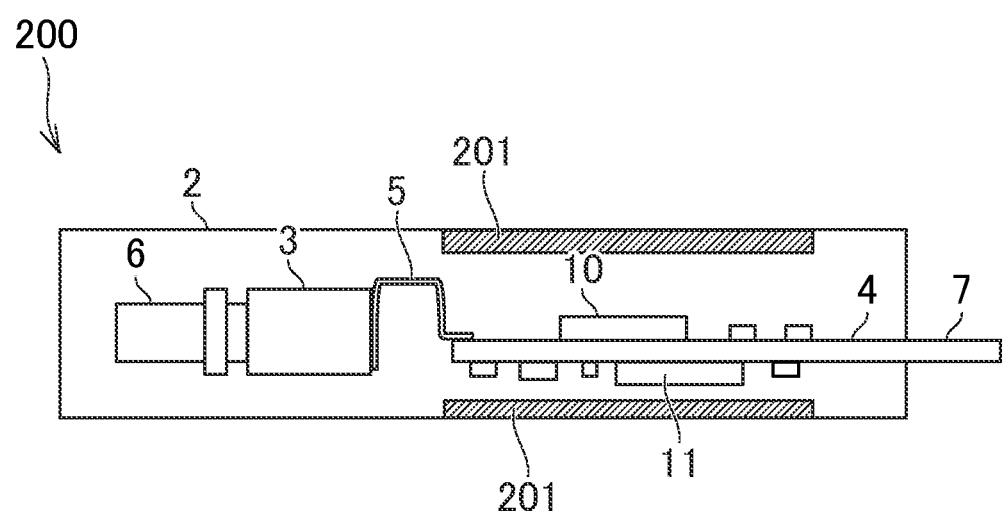
FIG. 2 is a schematic vertical sectional view of an optical module according to a comparative example in which electromagnetic wave absorbers are widely disposed inside a case.
Figure 2:
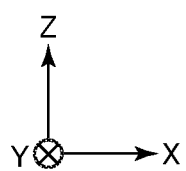
Figure 3:
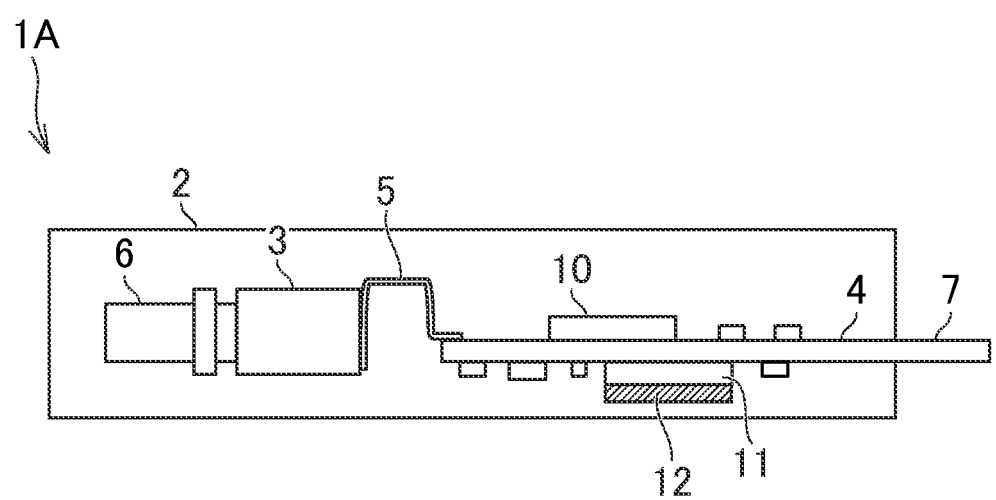
FIG. 3 is a schematic vertical sectional view of an optical module according to an example.
Figure 3:
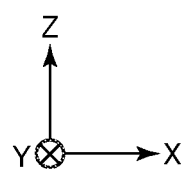

FIGS. 1 to 3 are schematic vertical sectional views of the optical module, and FIG. 3 shows the optical module 1A according to an example. On the other hand, FIGS. 1 and 2 are optical modules shown as comparative examples, an optical module 100 of FIG. 1 has a configuration without an electromagnetic wave absorber, and an optical module 200 of FIG. 2 has a configuration in which electromagnetic wave absorbers 201 are widely disposed inside a case 2 of the optical module.

Figure 4:
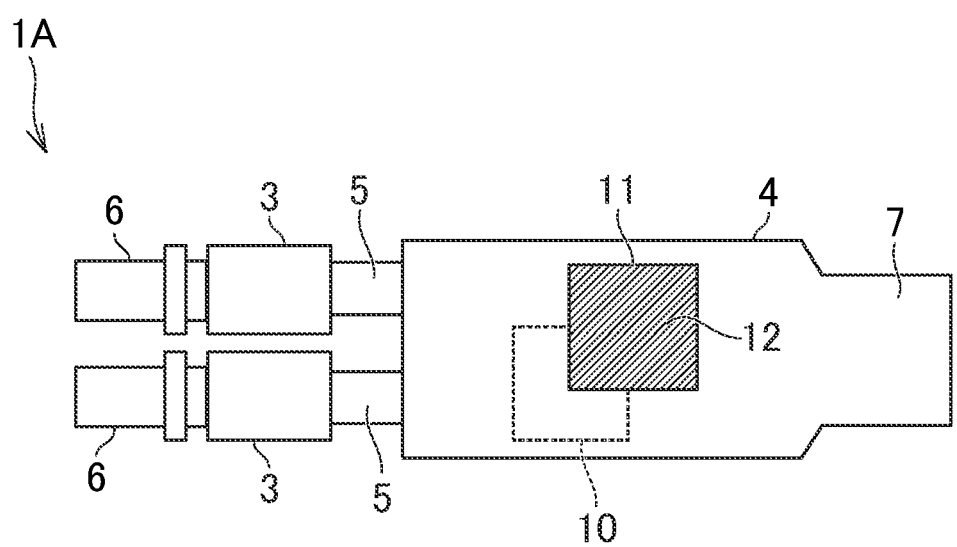
FIG. 4 is a schematic plan view of the optical module according to the example.
Figure 4:
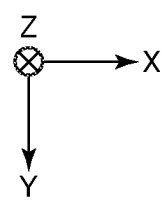

FIG. 4 is a schematic plan view of the optical module 1A according to an example, in which the case 2 is not shown and the components housed in the case 2 are viewed from below.

The optical module 1 includes an optical subassembly (OSA) 3, a circuit board 4, and a flexible printed circuit (FPC) board 5 that connects the OSA 3 and the circuit board 4 in the case 2.

The circuit board 4 is positioned horizontally in the case 2. That is, the main surface of the circuit board 4 is along an XY plane, and the direction perpendicular to the main surface is the Z-axis direction. In FIG. 4, the lower surface among the upper surface and the lower surface, which are the main surfaces of the circuit board 4, appears in front.

One end of the optical module 1 in the longitudinal direction (right side in FIG. 3) may be connected to a host device (not shown) such as a transmission device, and the other end (left side in FIG. 3) may be connected to an optical fiber (not shown). Correspondingly, the OSA 3 may be disposed close to the connection end with the optical fiber, and the circuit board 4 may be disposed close to the connection end with the host device. The optical module 1 may include, for example, an optical receptacle 6 as a connector for connecting the OSA 3 to the optical fiber, and as a connector for connection with the host device, for example, a card edge connector 7 may be provided at the end of the circuit board 4 on the host device side.

The optical module 1 may be a transceiver having a transmission function and a reception function and may include a transmitter optical subassembly (TOSA) for transmission and a receiver optical subassembly (ROSA) for reception as the OSA3. The TOSA may include, for example, a laser diode, may convert an electrical signal input from the circuit board 4 into an optical signal, and may output the optical signal to the optical fiber. On the other hand, the ROSA may include, for example, a photodiode, may convert an optical signal input from the optical fiber into an electrical signal, and may output the electrical signal to the circuit board 4.

The circuit board 4 may be a printed board. The circuit board 4 may be a multilayer board, for example, and may be a double-sided board on which electronic components can be mounted on both main surfaces. The circuit board 4 may be a rigid board. However, the rigid board is not limited as long as electronic components can be mounted on both sides.

The circuit board 4 may be provided with a circuit that is electrically connected to the OSA 3. Specifically, a conductor pattern such as wiring may be formed on the circuit board 4. For example, a high-frequency component 10 may be disposed on the upper surface which is one main surface of the circuit board 4, and for example, a low-frequency component 11 may be disposed on the lower surface which is the other main surface. Here, these components refer to those mounted on the circuit board 4 and do not include wiring formed on the circuit board 4.

The high-frequency component 10 may be an electronic component that operates with a high-frequency signal having a frequency equal to or higher than a predetermined reference value according to the frequency of the optical signal transmitted and received by the optical module 1, and may be a source of electromagnetic waves that cause EMI. For example, the high-frequency signal may be an electrical signal having a frequency of at least 1 Gbps or more.

Specifically, a circuit that can be a source of electromagnetic waves in the optical module 1 is a drive circuit that drives a laser diode of TOSA, a clock data recovery circuit (CDR), an amplifier circuit that amplifies the electrical signal output by ROSA, or a digital signal processor (DSP) that processes an electrical signal, and/or the like. For example, the high-frequency component 10 may be an integrated circuit (IC) in which at least a part of these circuits is formed. For example, the CDR has a function of separating an electrical signal output from ROSA into a clock and data. In the CDR for transmission, the waveform shaping of the high-frequency signal supplied to the laser driver is performed. ROSA can also be included in high-frequency components that are sources of EMI.

The low-frequency component 11 may be an electronic component that operates at a lower frequency than the high-frequency signal in the high-frequency component 10. Here, the lower frequency may be a frequency lower than a reference value that defines a high frequency. Basically, a low-frequency signal is a sufficiently low-speed electric signal such as 100 MHz or less with respect to the above-described high-frequency signal. DC signals are also included in low-frequency signals.

For example, the low-frequency component 11 may be an IC including at least one of a microprocessor or a power supply circuit. For example, the IC stores a semiconductor chip in a package made of resin and/or the like, and the package has a thin and plate-like shape in which the dimension in the Z direction is smaller than the dimensions in the X and Y directions on the circuit board 4. For example, the microprocessor performs processing of receiving an LD ON/OFF command from the host device and controlling the TOSA or transmitting information obtained from each unit in the optical module 1 to the host device.

In the optical module 1, the low-frequency component 11 may be disposed on the main surface of the circuit board 4 opposite to the high-frequency component 10 so as to overlap at least partly with the high-frequency component 10 in a plan view. Then, the electromagnetic wave absorber 12 may be disposed in contact with the upper surface of the low-frequency component 11, that is, the surface facing the negative direction of the Z axis in FIG. 3. In the disposition of the electromagnetic wave absorber 12, the optical module 1 may be different from the comparative examples of FIGS. 1 and 2. That is, as described above, the optical module 100 in FIG. 1 may not include an electromagnetic wave absorber. The optical module 200 in FIG. 2 may include the electromagnetic wave absorbers 201 disposed on the inner surfaces of the case 2 of the optical module. The electromagnetic wave absorbers 201 in FIG. 2 may be disposed on the upper and lower inner surfaces of the case 2, and each electromagnetic wave absorber 201 may have a spread facing a region where a plurality of components on the circuit board 4 are disposed. In contrast, the electromagnetic wave absorber 12 of the optical module 1 may be disposed only on one side of the circuit board 4 and limited to the upper surface of the low-frequency component 11 that overlaps with the high-frequency component 10 as shown in FIGS. 3 and 4.

The optical module 1A of the implementation of FIG. 4 shows an example in which the electromagnetic wave absorber 12 is disposed on the entire upper surface of the low-frequency component 11, in which the shaded region of the low-frequency component 11 is covered with the electromagnetic wave absorber 12. Other small electronic components (such as resistors and capacitors) may also be mounted on the surface of the circuit board 4 on which the low-frequency component 11 and the high-frequency component 10 are mounted, but the illustration thereof is omitted in FIG. 4. On the other hand, in the optical module 1, the electromagnetic wave absorber 12 may be disposed only on a part of the upper surface of the low-frequency component 11. FIGS. 5 to 9 show examples thereof, and are schematic plan views of optical modules 1B to 1F according to other examples. Like FIG. 4, with the illustration of the case 2 omitted, FIGS. 5 to 9 show the components housed in the case 2 viewed from below, and the electromagnetic wave absorber 12 is disposed in the shaded region in the low-frequency component 11.

Here, regarding the layout in the XY plane, the high-frequency component 10 and the low-frequency component 11 are squares of approximately the same size having sides along the X axis and the Y axis, and FIGS. 4 to 9 exemplify a case where the lower left quarter of the low-frequency component 11 overlaps with the upper right region of the high-frequency component 10. However, these conditions are examples, and the present description can be applied without being limited to this case.

Figure 5:
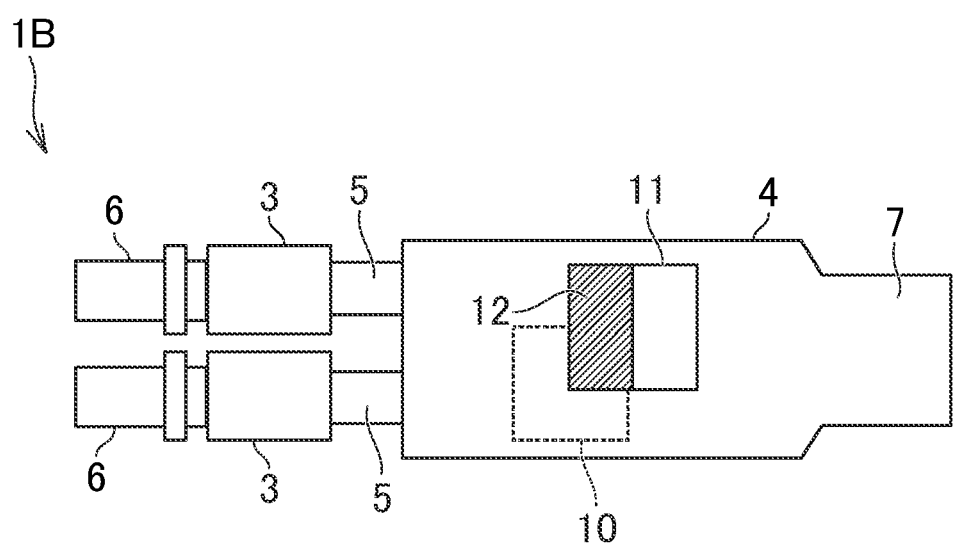
FIG. 5 is a schematic plan view of an optical module according to another example.
Figure 5:
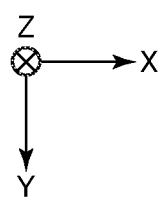
Figure 6:
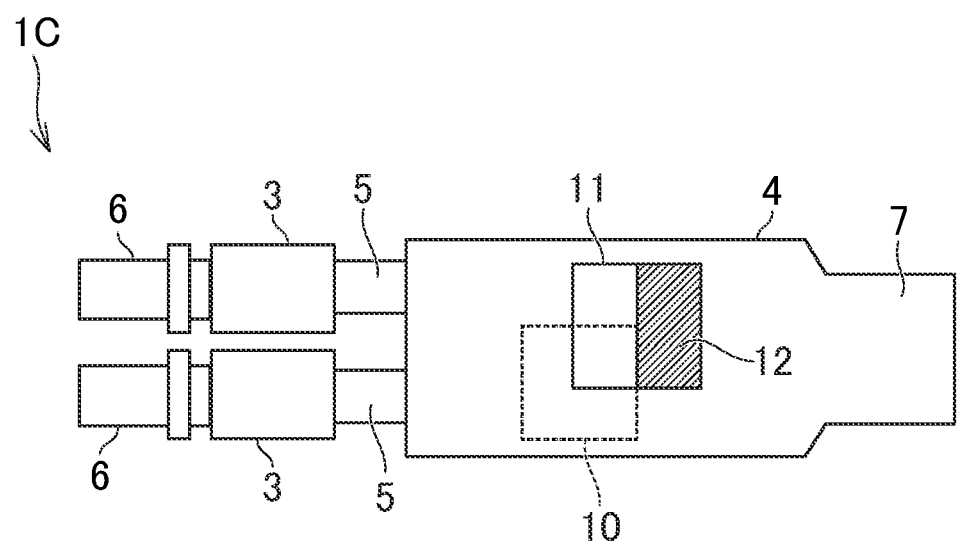
FIG. 6 is a schematic plan view of an optical module according to another example.
Figure 6:
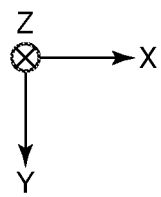

In the optical module 1B of the implementation shown in FIG. 5, the electromagnetic wave absorber 12 may be disposed so as to cover the left half of the low-frequency component 11. On the other hand, in the optical module 1C of the implementation shown in FIG. 6, the electromagnetic wave absorber 12 may be disposed so as to cover the right half of the low-frequency component 11.

Figure 7:
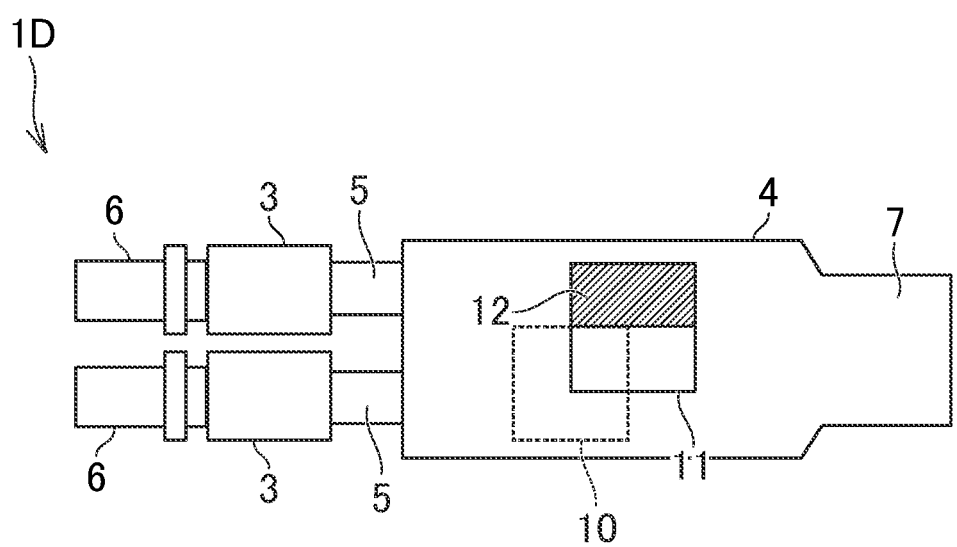
FIG. 7 is a schematic plan view of an optical module according to another example.
Figure 8:
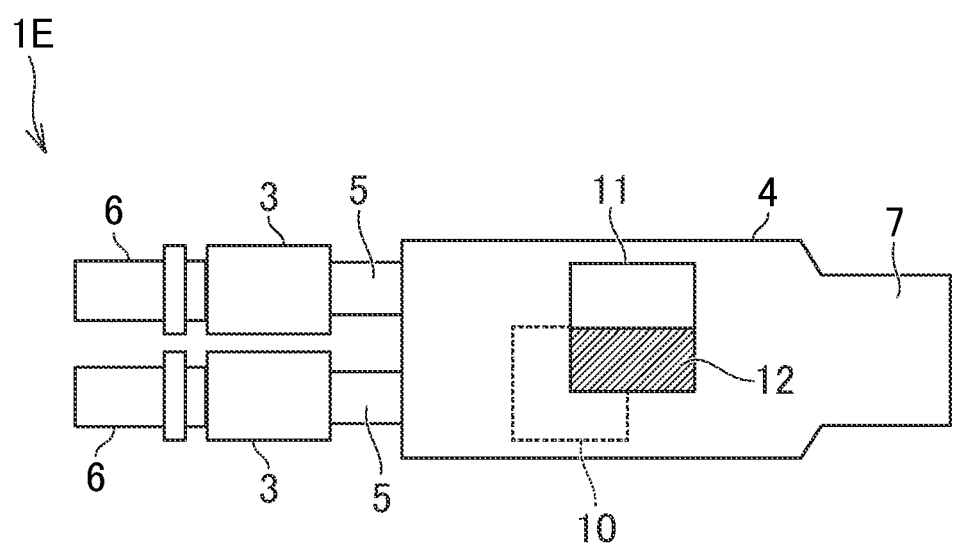
FIG. 8 is a schematic plan view of an optical module according to another example.
Figure 8:
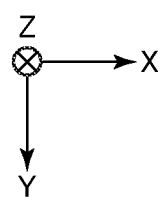
Figure 9:
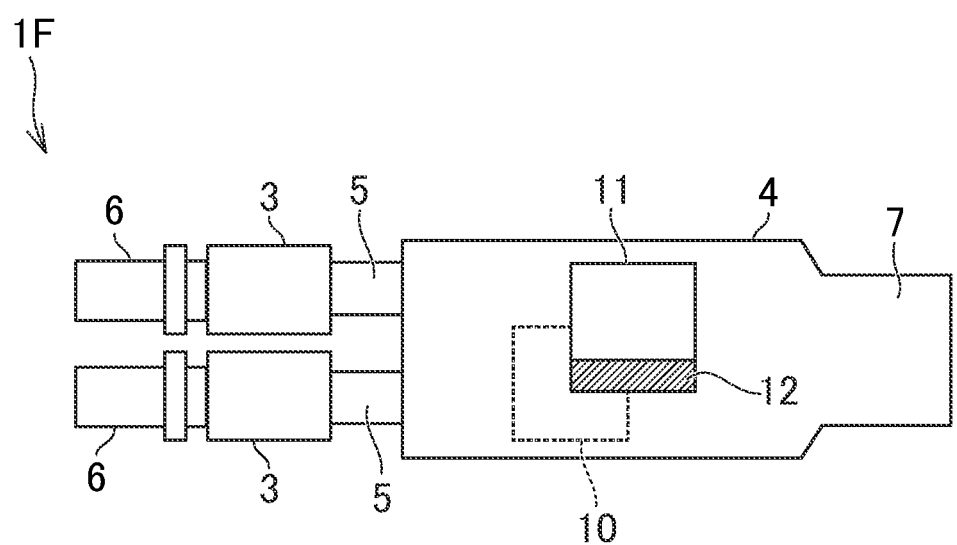
FIG. 9 is a schematic plan view of an optical module according to another example.

In the optical module 1D of the implementation shown in FIG. 7, the electromagnetic wave absorber 12 may be disposed so as to cover the upper half of the low-frequency component 11. On the other hand, in the optical module 1E of the implementation shown in FIG. 8, the electromagnetic wave absorber 12 may be disposed so as to cover the lower half of the low-frequency component 11. In the optical module 1F of the implementation shown in FIG. 9, the electromagnetic wave absorber 12 may be disposed so as to cover the lower quarter of the low-frequency component 11.

Figure 10:
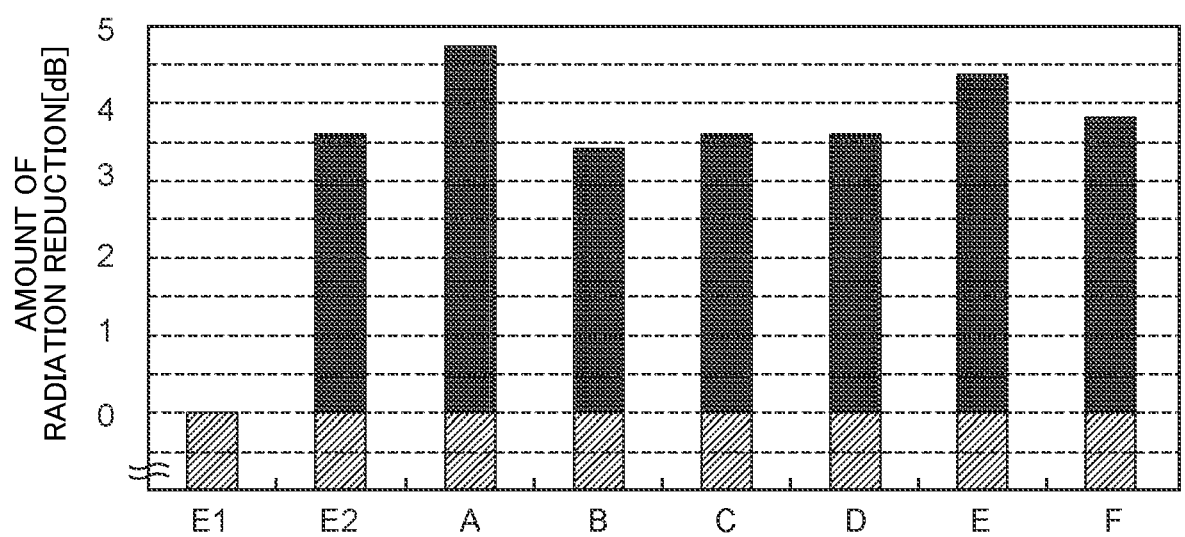
FIG. 10 is a graph showing an effect of reducing electromagnetic waves in the optical module according to the examples of FIGS. 4 to 9.

FIG. 10 is a graph showing the effect of reducing electromagnetic waves in the optical modules 1A to 1F according to the implementations of FIGS. 4 to 9, where the bar graphs A to F are graphs related to the optical modules 1A to 1F, respectively. For comparison, FIG. 10 also shows the effects of the optical modules 100 and 200 of the comparative examples shown in FIGS. 1 and 2, where the bar graph E1 is a graph related to the optical module 100, and the bar graph E2 is a graph related to the optical module 200. The vertical axis in FIG. 10 indicates the amount of reduction in EMI radiation in decibels compared to the optical module 100 (bar graph E1).

The optical module 1A in which the electromagnetic wave absorber 12 is disposed on the entire upper surface of the low-frequency component 11 has the same electromagnetic wave reduction effect as the optical module 200 in which the large electromagnetic wave absorber 201 shown in FIG. 2 is disposed.

Also in the optical modules 1B to 1E in which the electromagnetic wave absorber 12 is disposed in the half area of the upper surface of the low-frequency component 11, the same electromagnetic wave reduction effect as that of the optical module 200 was obtained. As described above, a sufficient electromagnetic wave reduction effect can be obtained without disposing a radio wave absorber widely, which is advantageous in terms of cost. The larger the area of the electromagnetic wave absorber, the greater the electromagnetic wave reduction effect, and the largest reduction effect was obtained in a case where the entire surface of the low-frequency component 11 shown in FIGS. 3 and 4 was covered. However, a reduction effect comparable to that of the optical module 200 is obtained even with a smaller area shown in FIGS. 5 to 9. Among the optical modules 1B to 1F, the electromagnetic wave reduction effect is greatest in the optical module 1E in which the electromagnetic wave absorber 12 is disposed so as to cover the lower half of the low-frequency component 11. Therefore, when examining the optical module 1F in which the area of the electromagnetic wave absorber 12 is further reduced from the state of the optical module 1E, the optical module 1F covering a quarter of the area of the upper part of the low-frequency component 11 was also as effective as the optical module 200 provided with the large electromagnetic wave absorber 201. The area of the electromagnetic wave absorber 12 in the optical module 1F is 1/26 compared with the optical module 200.

In general, it is considered that an electromagnetic wave absorber is preferably disposed near an electromagnetic wave generation source as an EMI countermeasure. However, on the high-frequency component 10 that can be a source of electromagnetic waves, there is a case where a heat radiating component is disposed to improve the heat radiation property and an electromagnetic wave absorber cannot be disposed. On the other hand, if the side of the circuit board 4 on which the high-frequency component 10 is disposed is the front surface, it is considered that electromagnetic waves are not radiated to the back side of the circuit board 4 on which the high-frequency component 10 is not disposed, but the electromagnetic wave generated on the front surface side is reflected in the case 2 of the optical module and can also travel to the back-surface side of the circuit board 4. Due to the recent miniaturization of optical modules, the wiring density in the inner layer of the circuit board 4 increases as the mounting density of the circuit board 4 increases, making it difficult to provide the circuit board 4 with a layer having a ground (GND) only. As a result, the electromagnetic wave generated on the front-surface side easily passes through the inner layer of the circuit board 4 and reaches the back-surface side. Therefore, it is presumed that the electromagnetic wave absorber 12 can be disposed only on the back side of the circuit board 4 to reduce EMI.

Here, also on the back-surface side, it is effective to dispose the electromagnetic wave absorber 12 at a position closer to the high-frequency component 10 in a plan view. However, printed wiring is also formed on the back side of the circuit board 4, and many small components such as resistors, coils, capacitors may be mounted, and it may not be easy to dispose the electromagnetic wave absorber directly on the back surface of the circuit board 4 or on the small components even near the high-frequency component 10, depending on the characteristics of the material of the electromagnetic wave absorber.

On the other hand, with the recent miniaturization of optical modules, many functions have been integrated into one IC component. Therefore, for example, a relatively large IC component, such as a microcomputer, is often disposed on the back side of the high-frequency component 10. Since the upper part of the IC component is flat and has a certain area and is protected by the package, the electromagnetic wave absorber 12 can be easily disposed on the component regardless of the material. Furthermore, the low-frequency component 11 does not require much heat dissipation, and it is often unnecessary to attach a heat dissipation component. Therefore, the electromagnetic wave absorber 12 may be disposed on the upper surface of the low-frequency component 11 that is disposed so as to overlap at least partly with the high-frequency component 10 in a plan view, whereby electromagnetic wave absorber 12 is disposed near the high-frequency component 10.

The electromagnetic waves generated in the high-frequency component 10 may not be necessarily uniform in the high-frequency component 10, and there may be places where electromagnetic waves are emitted more strongly than others. In that case, it may be preferable that the electromagnetic wave absorber 12 be disposed in the vicinity of a place in the high-frequency component 10 that strongly generates an electromagnetic wave.

Figure 11:
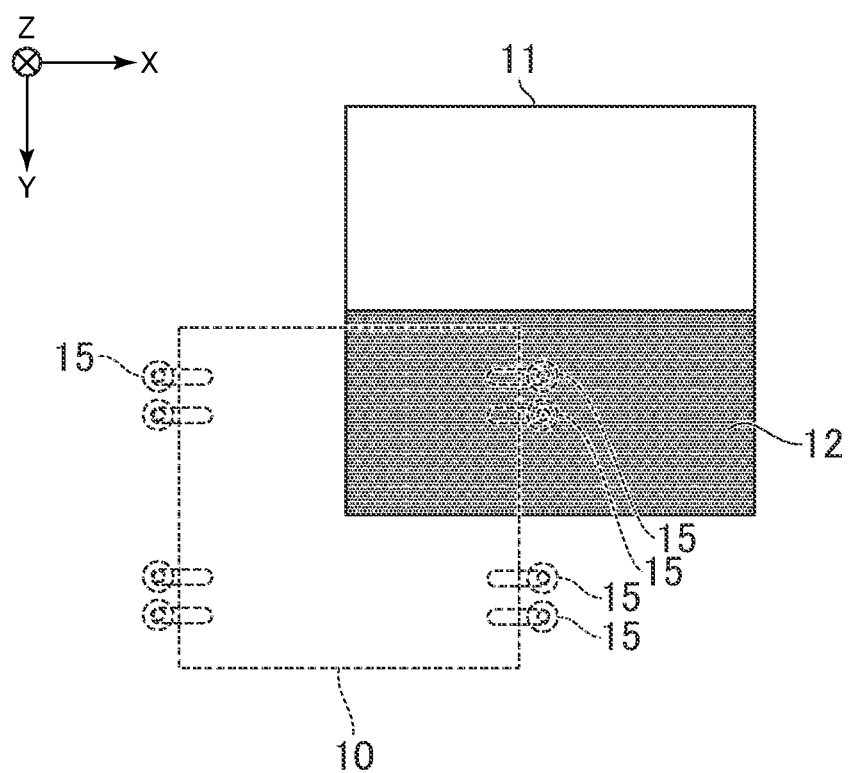
FIG. 11 is a schematic plan view of an enlarged portion of high-frequency components and low-frequency components in the optical module of FIG. 8.

For example, the electrical connection point between the high-frequency component 10 and the circuit board 4 can be a relatively strong source. FIG. 11 is a schematic plan view showing an implementation related to this point and shows an enlarged view of the high-frequency component 10 and the low-frequency component 11 of the optical module 1E shown in FIG. 8. Although not shown in FIGS. 4 to 9, the terminals of the high-frequency component 10 may be arranged on the side along the Y axis of the high-frequency component 10, and FIG. 11 shows the arrangement of terminals 15. The low-frequency component 11 may be disposed so as to overlap with some terminals 15 of the high-frequency component 10, and in the optical module 1E, the electromagnetic wave absorber 12 may be disposed in the lower half of the upper surface of the low-frequency component 11 including the portion overlapping with the connection point between the terminals 15 and the circuit board 4. For example, the electromagnetic wave generated at the connection point can reach the back side of the circuit board 4 through the inner layer of the circuit board 4, but it can be expected that the electromagnetic wave is reduced more suitably by covering the portion with the electromagnetic wave absorber 12. It is presumed that this is the reason why the optical module 1E has the highest electromagnetic wave reduction effect among the optical modules 1B to 1E in which the electromagnetic wave absorber 12 having the same area is disposed.

The electromagnetic wave absorber 12 may be a resistive absorbing material, a dielectric absorbing material, or a magnetic absorbing material. The electromagnetic wave absorber 12 may have a thickness such that the upper surface thereof contacts the inside of the case 2 of the optical module, or may have a thickness having a gap between the upper surface and the inside of the case 2.

In the above-described implementations, examples are shown in which there is one high-frequency component 10 and one low-frequency component 11 on which the electromagnetic wave absorber 12 is disposed, but the present description is not limited thereto. Specifically, in a case where there are a plurality of high-frequency components 10 that serve as electromagnetic wave sources, the electromagnetic wave absorber 12 can be disposed on the low-frequency components 11 located on the back side of each of the high-frequency components 10. Further, the electromagnetic wave absorber 12 may be disposed on a plurality of low-frequency components 11 that overlap with one high-frequency component 10.

In a case where OSA3 is an electromagnetic wave source, the OSA3 may be disposed on the front surface of the circuit board 4 instead of disposing the OSA3 and the circuit board 4 in a line in the X-axis direction as shown in FIG. 3, whereby the electromagnetic wave absorber 12 can be provided on the upper surface of the low-frequency component 11 disposed at a position overlapping with the OSA 3 in a plan view.

As described above, EMI countermeasures can be efficiently performed at low cost without using a large electromagnetic wave absorber.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical module, comprising:
   a circuit board on which electronic components are disposed;
   a high-frequency component that is disposed on a main surface of the circuit board and operates at a frequency equal to or higher than a predetermined reference value according to a frequency of an optical signal,
   wherein a first surface of the high-frequency component is in contact with the main surface of the circuit board;
   a low-frequency component that is disposed on another main surface of the circuit board so as to overlap at least partly with the high-frequency component in a plan view and operates at a frequency less than the reference value,
   wherein a first surface of the low-frequency component is in contact with the other main surface of the circuit board; and
   an electromagnetic wave absorber that is disposed on a second surface of the low-frequency component that is opposite the first surface of the low-frequency component,
   wherein another electromagnetic wave absorber is not disposed on a second surface of the high-frequency component that is opposite the first surface of the high-frequency component.

2. The optical module of claim 1, wherein the electromagnetic wave absorber is disposed so as to cover a region of the second surface of the low-frequency component that overlaps with the high-frequency component.

3. The optical module of claim 1, wherein the electromagnetic wave absorber is disposed on an entirety of the second surface of the low-frequency component.

4. The optical module of claim 1, wherein the electromagnetic wave absorber is disposed in a region of the second surface of the low-frequency component that overlaps with a terminal of the high-frequency component connected to the circuit board.

5. The optical module of claim 1, wherein the low-frequency component is an integrated circuit including at least one of a microprocessor or a power supply circuit.

6. The optical module of claim 1, wherein the high-frequency component is an integrated circuit including at least one of an optical subassembly for converting the optical signal into an electrical signal, an amplifier circuit for amplifying the electrical signal, a drive circuit for driving a semiconductor optical device that generates the optical signal, or a clock and data recovery circuit.

7. The optical module of claim 1, wherein the electromagnetic wave absorber is disposed only on a portion of the second surface of the low-frequency component, and
   wherein the portion of the second surface of the low-frequency component overlaps with a portion of the high-frequency component in the plan view.

8. The optical module of claim 1, wherein the electromagnetic wave absorber is disposed only on a portion of the second surface of the low-frequency component, and wherein the portion of the second surface of the low-frequency component does not overlap with the high-frequency component in the plan view.

9. The optical module of claim 1, wherein the electromagnetic wave absorber is disposed so as to overlap with one or more terminals of the high-frequency component.

10. The optical module of claim 1, wherein the electromagnetic wave absorber is disposed so as to overlap with a connection point between one or more terminals, of the high-frequency component, and the circuit board.

11. The optical module of claim 1, wherein a first surface of the electromagnetic wave absorber is in contact with the second surface of the low-frequency component, and wherein a second surface of the electromagnetic wave absorber is in contact with an inside of a case of the optical module.

12. The optical module of claim 1, wherein the electromagnetic wave absorber is one of:

a resistive absorbing material, a dielectric absorbing material, or a magnetic absorbing material.

13. The optical module of claim 1, wherein the electromagnetic wave absorber is disposed on a plurality of low-frequency components.

14. The optical module of claim 13, wherein the plurality of low-frequency components overlap the high-frequency component.

15. The optical module of claim 1, wherein the electromagnetic wave absorber is disposed so as to overlap an optical subassembly in the plan view.

16. The optical module of claim 1, further comprising:

an optical subassembly, and a flexible printed circuit board that connects the optical subassembly and the circuit board.

17. The optical module of claim 16, further comprising:

an optical receptor connecting the optical subassembly to an optical fiber.

18. The optical module of claim 1, further comprising:

a transmitter optical subassembly, and a receiver optical subassembly.

19. The optical module of claim 18, wherein the transmitter optical subassembly comprises a laser diode for converting an electrical signal into the optical signal.

20. The optical module of claim 18, wherein the receiver optical subassembly comprises a photodiode for converting the optical signal into an electrical signal.

* * * * *

UNITED STATES PATENT AND TRADEMARK OFFICE
CERTIFICATE OF CORRECTION

PATENT NO. : 10,948,670 B2  
APPLICATION NO. : 16/814686  
DATED : March 16, 2021  
INVENTOR(S) : Sachiko Mizuseki et al.

Page 1 of 1

It is certified that error appears in the above-identified patent and that said Letters Patent is hereby corrected as shown below:

On the Title Page

Item (74): currently reads Attorney, Agent, or Firm -- Hamty & Harrity, LLP; should instead read Attorney, Agent, or Firm -- Harrity & Harrity, LLP Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*